US010357852B2

(12) United States Patent
Kajikawa et al.

(10) Patent No.: US 10,357,852 B2
(45) Date of Patent: Jul. 23, 2019

(54) FLUX WITH DIBASIC ACID MIXTURE

(71) Applicant: Senju Metal Industry Co., Ltd., Tokyo (JP)

(72) Inventors: Yasuhiro Kajikawa, Tochigi (JP); Yoshinori Hiraoka, Tochigi (JP); Hiroyoshi Kawasaki, Tokyo (JP); Takashi Hagiwara, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 15/760,818

(22) PCT Filed: Sep. 15, 2016

(86) PCT No.: PCT/JP2016/077261
§ 371 (c)(1),
(2) Date: Mar. 16, 2018

(87) PCT Pub. No.: WO2017/047694
PCT Pub. Date: Mar. 23, 2017

(65) Prior Publication Data
US 2018/0257182 A1    Sep. 13, 2018

(30) Foreign Application Priority Data
Sep. 18, 2015   (JP) .................... 2015-185219

(51) Int. Cl.
B23K 35/36    (2006.01)
C08G 59/42    (2006.01)

(52) U.S. Cl.
CPC .......... *B23K 35/3613* (2013.01); *C08G 59/42* (2013.01)

(58) Field of Classification Search
CPC ....................................................... C08G 59/42
See application file for complete search history.

(56) References Cited

U.S. PATENT DOCUMENTS 7,743,966 B2   6/2010   Akamatsu et al.
9,902,022 B2   2/2018   Uehata et al.

FOREIGN PATENT DOCUMENTS

| JP | 3184695 A | 8/1991 |
| JP | 7169646 A | 7/1995 |
| JP | 890283 A | 4/1996 |
| JP | 2002301591 A | 10/2002 |
| JP | 20041030 A | 1/2004 |
| JP | 4757070 B2 | 8/2011 |
| JP | 201391093 A | 5/2013 |
| WO | 2015146473 A1 | 10/2015 |

*Primary Examiner* — Keith Walker
*Assistant Examiner* — Michael E. Gross
(74) *Attorney, Agent, or Firm* — The Webb Law Firm

(57) ABSTRACT

Provided is a flux, flux residue of which keeps a predetermined viscosity during reflow and after a reflow step without hindering wettability of a solder alloy, the flux being compatible with an underfill in an underfill hardening step. The flux contains a thermosetting resin, a hardening agent, an organic acid and a solvent in which the flux contains 3% or more by mass to 8% or less by mass of the resin, 1% or more by mass to 5% or less by mass of the hardening agent to remain within a limit of an additive amount of the resin, 5% or more by mass to 15% or less by mass of the organic acid and a remainder of the solvent.

8 Claims, 2 Drawing Sheets

[FIG.1A]
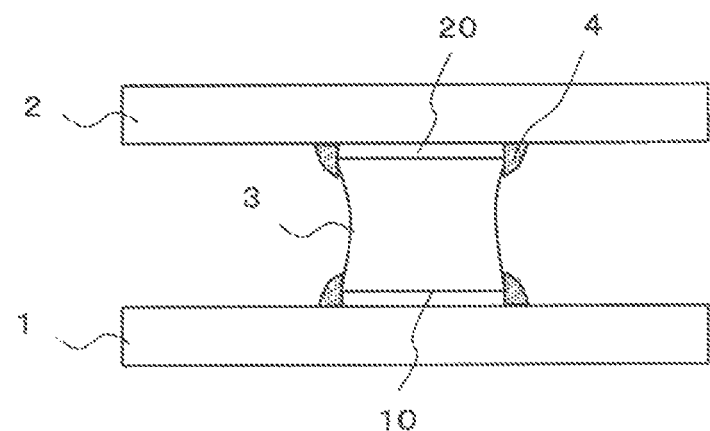
[FIG.1B]
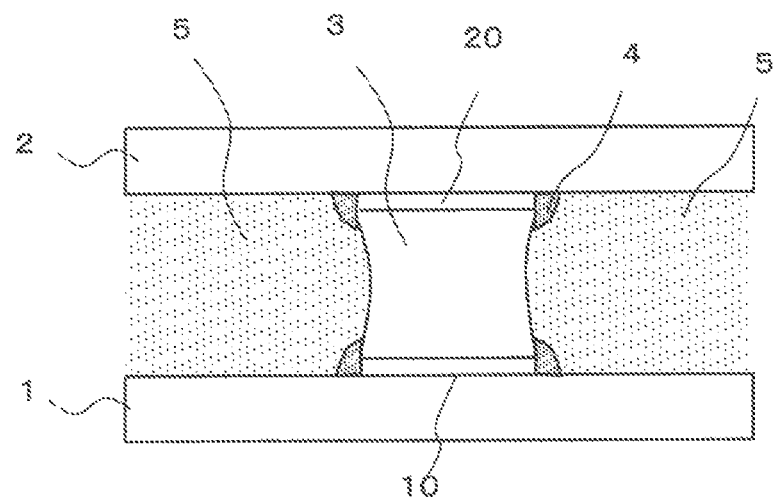

[FIG.1C]
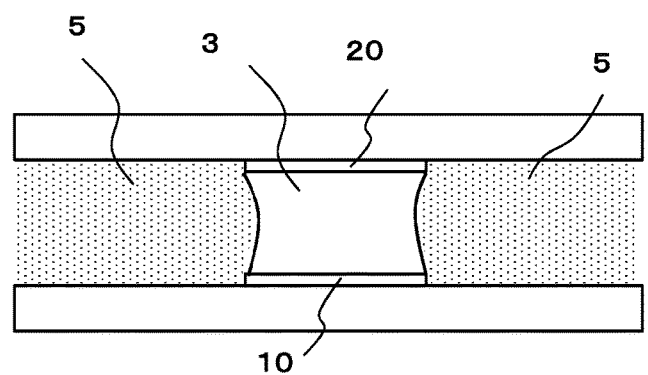

FLUX WITH DIBASIC ACID MIXTURE

CROSS-REFERENCE TO RELATED APPLICATIONS

This application is the United States national phase of International Application No. PCT/JP2016/077261 filed Sep. 15, 2016, and claims priority to Japanese Patent Application No. 2015-185219 filed Sep. 18, 2015, the disclosures of which are hereby incorporated in their entirety by reference.

TECHNICAL FIELD

The present invention relates to a flux used for performing soldering by which a join object portion is adhered by an underfill.

BACKGROUND

The flux used for soldering generally has efficacy to chemically remove any metal oxides existed on a solder alloy and a metal surface of a join object which is subject to the soldering and to allow any metallic elements to move through a boundary therebetween. Therefore, the soldering using the flux enables intermetallic compounds to be formed between the solder alloy and the metallic surface of the join object, thereby attaining any strong joining.

On the other hand, components of the flux include any components which cannot decompose or evaporate by heating during the soldering and they remain around the soldered parts as flux residue after the soldering.

Meanwhile, together with recent development in miniaturization of electronic components, an electrode to be soldered in the electronic component also becomes miniaturized. Therefore, an area which can be soldered by the solder alloy is limited so that it may be impossible to get sufficient joining strength by only the solder alloy.

Accordingly, a technology has been proposed in which the electronic component and the like are adhered by covering the join object part to be soldered with any resins such as underfill as parts-adhering means for strengthening the joining of the soldering.

Here, when the flux residue remains around the join object part to be soldered, the flux residue hinders adhering the join object part to the resin, so that it is impossible to maintain the strength thereof. Therefore, in order to cover the join object part by the resin, it is required to clean the flux residue. It, however, takes any times and costs to clean the flux residue.

Accordingly, a technology has been proposed in which a thermosetting resin contained in the flux can maintain its no-cured state after reflowing so that the resin contained in the flux residue can be compatible with the underfill (See, for example, Patent Document 1). In addition, a technology has also been proposed in which thermoplastic property is given to the resin contained in the flux and the flux contained in the flux residue is fluidized when the underfill is applied so as to be compatible with the underfill (See, for example, Patent Document 2).

DOCUMENTS FOR PRIOR ART

Patent Documents

Patent Document 1: Japanese Patent No. 4757070
Patent Document 2: Japanese Patent Application Publication No. 2013-91093

SUMMARY OF THE INVENTION

Problems to be Solved by the Invention

In the past flux, in order not to cure the resin by heating during the soldering, the flux residue has fluidity during a reflow step and after reflowing. Since the resin contained in the flux residue is not hardened, a surface of the flux residue has any viscosity. Thus, a fine foreign matter can be attached to the surface of the flux residue before the underfill has been filled.

The present invention solves such problems and has an object to provide a flux for allowing viscosity of the surface of the flux residue to be suppressed after a reflow step without hindering wettability of a solder alloy, the flux being compatible with an underfill.

Means for Solving the Problems

It has been found out that by adding a predetermined amount of a hardening agent to a flux to which a thermosetting resin has been added, the resin has not fluidity such that it flows out to keep a predetermined viscosity even by heating up to a heating temperature during the soldering and the viscosity of the surface of the flux residue is suppressed after the soldering.

Thus, the present invention relates to a flux containing a thermosetting resin, a hardening agent, an organic acid and a solvent in which the organic acid is a long-chain dibasic acid mixture in which long-chain dibasic acids having the following compositions (1) through (4) are respectively mixed at a predetermined ratio thereof, the ratios of the long-chain dibasic acids having the compositions (1) through (4) are as follows when the entire of the long-chain dibasic acid mixture is set to be 100%, and the flux contains 3% or more by mass to 8% or less by mass of the resin, 1% or more by mass to 5% or less by mass of the hardening agent to remain within a limit of an additive amount of the resin, 5% or more by mass to 15% or less by mass of the long-chain dibasic acid mixture and a remainder of the solvent, (1) 2-Methylnonanedioic acid, 30% to 60% by mass;
(2) 4-(Methoxycarbonyl)-2,4-dimethylundecanedioic acid, 8% to 20% by mass;
(3) 4, 6-bis(Methoxycarbonyl)-2,4,6-trimethyltridecanedioic acid, 8% to 20% by mass; and
(4) 8,9-bis(Methoxycarbonyl)-8,9-dimethylhexadecanedioic acid, 15% to 30% by mass.

In the flux of this invention, by adding a predetermined amount of the hardening agent to the thermosetting resin, the resin has not fluidity such that it flows out to keep a predetermined viscosity even by heating up to a heating temperature during the soldering and the viscosity of the surface of the flux residue is suppressed after the soldering.

Effects of the Invention

According to the present invention, by adding a predetermined amount of the hardening agent to the flux, flux residue of which is compatible with the underfill after reflowing, the resin contained in the flux has not fluidity such that it flows out by heating during the soldering and the flux residue can be suppressed so as to be attached to a portion other than the join object part. In addition, since it is possible to suppress the viscosity of the surface of the flux residue, the flux can suppress attachment of the fine foreign matter to the surface of the flux residue and suppress an entry of the fine foreign matter to the underfill.

BRIEF DESCRIPTION OF THE DRAWINGS

FIG. 1A is an illustration showing an underfill-filling step.
FIG. 1B is an illustration showing the underfill-filling step.
FIG. 1C is an illustration showing the underfill-filling step.

EMBODIMENT FOR CARRYING OUT THE INVENTION

The flux according to this embodiment contains a resin, a hardening agent, an organic acid and a solvent. The resin does not evaporate at a heating temperature during the soldering and remains as flux residue. As the resin, a thermosetting epoxy resin is added.

In the epoxy resin, as bisphenol type, a bisphenol A type, a bisphenol AP type, a bisphenol AF type, a bisphenol B type, a bisphenol BP type, a bisphenol C type, a bisphenol E type, a bisphenol F type, a bisphenol G type, a bisphenol M type, a bisphenol S type, a bisphenol P type, a bisphenol PH type, a bisphenol TMC type, a bisphenol Z and the like are exemplified. As alicyclic epoxy resin, 3',4'-Epoxycyclohexylmethyl 3,4-epoxycyclohexanecarboxylate, 1,2-Epoxy-4-vinylcyclohexane and the like are exemplified. In this embodiment, the bisphenol A type was used. As the hardening agent, dicyandiamide, organic acid dihydrazide, imidazole derivatives, amine adduct-based hardening agent, carboxylic acid blocked by vinyl ether, onium salt, ketimine compound, microencapsulated imidazole, acid anhydride, phenolic compound and the like are exemplified. As the acid anhydride, phthalic anhydride, maleic anhydride, citraconic anhydride, 3, 3',4,4'-biphenyltetracarboxylic dianhydride, 4-methyl-hexahydrophthalic anhydrite, hexahydrophthalic anhydrite, methyl bicycle [2.2.1]heptane-2,3-dicarboxylic anhydride, bicycle [2.2.1]heptane-2,3-dicarboxylic anhydride, 1,2,3,6-tetrahydrophthalic anhydride, 3,4,5,6-tetrahydrophthalic anhydride, ethylene glycol bisanhydrotrimellitate, glycerin bisanhydrotrimellitate monoacetate, tetrapropenyl succinic anhydride are exemplified. The epoxy resin may be any of the above-indicated compounds or may be a mixture in which two or more of these compounds are mixed. In addition, the hardening agent may be any of the above-indicated compounds or may be a mixture in which two or more of these compounds are mixed. Further, the epoxy resin and the hardening agent may be an optional combination of the above-indicated compositions.

As the organic acid, for example, carboxylic acid is added in order to act as an activator. In addition, the organic acid is preferably a long-chain organic acid having a carbon number which is more than a predetermined number in order to allow the flux residue of the resin to have heat-softening characteristics. For example, a long-chain dibasic acid is added. By adding the long-chain dibasic acid as the organic acid, wettability of the solder is improved without hindering any functions of the flux to remove any oxides from a metallic surface by adding the thermosetting resin and remarkably degrading any activity by heating during the soldering.

The long-chain dibasic acid is a long-chain dibasic acid mixture containing one kind or more of a first long-chain dibasic acid having an alkyl group at a side chain and a second long-chain dibasic acid having an alkyl group and an alkoxycarbonyl group at a side chain and having 8 or more carbon numbers at a main chain between carboxyl groups of both ends thereof. The long-chain dibasic acid mixture preferably contains one kind or more of long-chain dibasic acid having two alkoxycarbonyl groups or more as the second long-chain dibasic acid.

Such a long-chain dibasic acid mixture is preferably any of the compounds indicating following compositions (1), (2), (3) or (4) or is preferably a mixture in which two kinds or more of these compounds are mixed at a predetermined ratio thereof.

(1) 2-Methylnonanedioic acid;
(2) 4-(Methoxycarbonyl)-2,4-dimethylundecanedioic acid;
(3) 4, 6-bis(Methoxycarbonyl)-2,4,6-trimethyltridecanedioic acid; and
(4) 8,9-bis(Methoxycarbonyl)-8,9-dimethylhexadecanedioic acid.

Further, the preferable mixture ratios of the above-indicated long-chain dibasic acid mixture having the above-indicated compositions (1) through (4) are as follows when the ratio of the entire of the long-chain dibasic acid mixture is set to be 100%.

(1) 30% to 60% by mass;
(2) 8% to 20% by mass;
(3) 8% to 20% by mass; and
(4) 15% to 30% by mass.

As the solvent, isobornyl cyclohexanol, hexylene glycol, dibutyl diglycol, hexyl diglycol and the like are exemplified. The solvent may be any of the above-indicated compounds or may be a mixture in which two kinds or more of these compounds are mixed.

As a thixotropic agent, 0% or more by mass to 5% or less by mass of higher fatty acid amide and/or hydrogenated castor oil may be added. 0% or more by mass to 1% or less by mass of the silane coupling agent may be also added. The addition of the thixotropic agent allows workability such as printability to be improved. The addition of the silane coupling agent allows adhesion of the thermosetting resin to be improved. The thixotropic agent may be any of the above-indicated compounds or may be a mixture in which two kinds or more of these compounds are mixed.

In this embodiment, the flux contains 3% or more by mass to 8% or less by mass of the resin, 1% or more by mass to 5% or less by mass of the hardening agent to remain within a limit of content of the resin, 5% or more by mass to 15% or less by mass of the organic acid and a remainder of the solvent.

Polymerization reaction advances by heating in a composite in which a thermosetting resin and a hardening agent are mixed, thereby being hardened. The advance of polymerization alters based on an amount of added hardening agent. In contrast, a composite in which a long-chain dicarboxylic acid is added to a thermosetting resin has a characteristic analogous to thermoplasticity, so that the resin is easy to be softened by heating. Softening the resin by heating allows a heated composite to have fluidity so that a surface of the composite has viscosity.

In the flux according to this embodiment, by adding the hardening agent and the long-chain dicarboxylic acid to the thermosetting resin, it is possible to decrease a glass transition point at which the resin starts to soften, thereby enabling the resin to have a predetermined fluidity at a lower temperature than a heating temperature during the soldering. Further, by adding a predetermined amount of the hardening agent, it does not have such a fluidity that flows out even when heating it up to the heating temperature during the soldering, to keep a predetermined viscosity. The viscosity of a surface of the flux residue after the soldering is suppressed.

In the flux according to this embodiment, by adding the long-chain dicarboxylic acid as the organic acid, it removes oxides from the metallic surface which is a join object without remarkably degrading activity by the heating during the soldering.

From the flux, the solvent evaporates at a heating temperature during the soldering and a component which does not evaporate at the heating temperature during the soldering becomes the flux residue, thereby remaining on the join object part including the join object and the vicinity thereof.

In the flux according to this embodiment, the thermosetting resin becomes the residue. Moreover, by adding acid anhydride as the hardening agent, the resin in the flux does not have such a fluidity that flows out by the heating during the soldering, so that it is possible to suppress any attachment of the resin to a portion other than the join object part. In addition, when decreasing the temperature after the soldering below the glass transition point of the resin in the flux residue, the resin becomes solid.

FIGS. 1A through 1C are illustrations each showing an underfill-filling step. When an electrode 10 on a substrate 1 and an electrode 20 of a semiconductor chip 2 are joined to each other by a solder alloy 3 using the flux according to this embodiment, flux residue 4 remains around the join object parts as shown in FIG. 1A, after a reflow step of the soldering has been performed.

After the soldering, when, for example, a thermosetting resin and a hardening agent are filled as underfill 5 around the join object parts, as shown in FIG. 1B, and heated to a temperature exceeding the glass transition point of the resin in the flux residue, the resin in the flux residue softens to be compatible with the underfill.

Accordingly, as shown in FIG. 1C, the underfill 5 is hardened with the resin in the flux residue being mixed in the underfill. Therefore, the electrode 20 of the semiconductor chip 2 which is a join object and the joining electrode 10 of the substrate 1 are adhered by the underfill 5 without cleaning the flux residue.

EXECUTED EXAMPLES

The fluxes of the executed examples and the comparison examples, which have the compositions shown in the following Table 1, were prepared. Solder wettability, viscosity and existence or nonexistence of generation of voids in the underfill were inspected. It is to be noted that the composition rates in the Table 1 are their percent by mass in the flux composites. The evaluation method of each inspection will be described.

(1) Inspection of Solder Wettability (a) Evaluation Method

The fluxes were applied to Cu plates and the solder balls were mounted on the fluxes applied to the Cu plates. After the reflowing, each spread solder diameter was measured. The reflow step was performed in which, using a reflow apparatus setting a peak temperature to be 250 degrees C., the temperature was increased by one degree C. until 250 degrees C. for one second from 35 degrees C. After the temperature reached 250 degrees C., the heating process was performed for 30 seconds. The composition of each of the solder balls was 96.5Sn-3.0Ag-0.5Cu and the diameter thereof was 0.3 mm.

(b) Decision Criteria

O: The spread solder diameter was 510 μm or more; or

X: The spread solder diameter was less than 510 μm.

(2) Inspection of Viscosity (a) Evaluation Method

The fluxes were applied to Cu plates and the fluxes applied to the Cu plates were heated up to 300 degrees C. and became a condition in which a reflow was performed. The solder balls each having a diameter of 100 μm were scattered over the flux residues after the heating. The Cu plates on which the solder balls were scattered then inclined 30 degrees and movement of the solder balls was inspected.

(b) Decision Criteria

O: The solder balls rolled at an extent similar to that in a case where there was no flux residue in Cu; or X: The solder balls did not roll by viscosity of the flux residue.

(3) Inspection of Existence or Nonexistence of generation of voids in Underfill (a) Evaluation Method The fluxes were applied to Cu plates and the reflow was performed thereon. Existence or nonexistence of generation of voids in the underfill was then inspected on the basis of existence or nonexistence of a step of hardening the flux residue. The reflow step was performed in which the temperature was increased by three degrees C. until 250 degrees C. for one second from a room temperature and the heating process was performed for 30 seconds after it reached 250 degrees C. Any hardening step was not performed in both of the executed examples and the comparison examples after the reflow step was performed. In both of the executed examples and the comparison examples, spacers each having a height of 25 μm were put on both side of a position to which the flux was applied and a glass plate was mounted on the spacers. The underfill was filled to a position between the Cu plate and the glass plate. After the underfill was filled, the heating process was performed at 165 degrees C. for two hours.

(b) Decision Criteria

O: Any void was not seen; or

X: A void was seen.

TABLE 1

| | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 | COMPARISON EXAMPLE 1 | COMPARISON EXAMPLE 2 |
|---|---|---|---|---|---|---|---|---|---|
| ISOBONYL CYCLOHEXANOL | 70 | 70 | 70 | 75 | 65 | 67 | 72 | 73 | 79 |
| HEXYL DIGLYCOL | 10 | 10 | 10 | 10 | 10 | 10 | 10 | 10 | 10 |
| GLUTARIC | 10 | | | | | | | | |

TABLE 1-continued

|  | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 | COMPARISON EXAMPLE 1 | COMPARISON EXAMPLE 2 |
|---|---|---|---|---|---|---|---|---|---|
| ACID |  |  |  |  |  |  |  |  |  |
| SEBACIC ACID |  | 10 |  |  |  |  |  |  |  |
| LONG-CHAIN DIBASIC ACID MIXTURE |  |  | 10 | 5 | 15 | 10 | 10 | 12 | 1 |
| EPOXY RESIN | 5 | 5 | 5 | 5 | 5 | 8 | 5 | 5 | 5 |
| ACID ANHYDRIDE | 5 | 5 | 5 | 5 | 5 | 5 | 3 | 0 | 5 |
| TOTAL | 100 | 100 | 100 | 100 | 100 | 100 | 100 | 100 | 100 |
| WETTABILITY | ○ | ○ | ○ | ○ | ○ | ○ | ○ | ○ | X |
| VISCOSITY | ○ | ○ | ○ | ○ | ○ | ○ | ○ | X | ○ |
| NO VOID DUE TO NO HARDENING STEP | ○ | ○ | ○ | ○ | ○ | ○ | ○ | ○ | ○ |

In the matter of solder wettability, as shown in the Table 1, in the flux of the executed example 1 in which glutaric acid within the above-indicated content range is added as dicarboxylic acid that is one example of the organic acid; in the flux of the executed example 2 in which sebacic acid within the above-indicated content range is added as the long-chain dicarboxylic acid that is one example of the organic acid; and in the fluxes of the executed examples 3 to 7 in which long-chain dibasic acid mixtures within the above-indicated content ranges are added as long-chain dicarboxylic acid that is one example of the organic acid, they all have obtained excellent wettability. In contrast, in the comparison example 2 in which long-chain dibasic acid mixture having a content blow the predetermined amount of content is added, it has not obtained any excellent wettability.

Further, in the matter of viscosity of the flux residue, as shown in the Table 1, in the fluxes of the executed examples 1 to 7 in which acid anhydride within the above-indicated content ranges is added as the hardening agent, viscosity of the surface of the flux residue has been suppressed. In contrast, in the flux of the comparison example 1 in which any hardening agent is not added, it has been determined that the surface of the flux residue has high viscosity.

Additionally, in the matter of existence or nonexistence of generation of voids in the underfill, it has been determined that any void is not generated if a hardening step is not performed after the reflow. In other words, the resin in the flux residue is compatible with the underfill and the underfill is hardened with the resin in the flux residue being mixed to the underfill.

INDUSTRIAL APPLICABILITY

This invention is applicable to the flux used in a joining method in which a substrate and an electronic component or the like are adhered by underfill.

EXPLANATION OF CODES

1: Substrate
10: Electrode
2: Semiconductor Chip
20: Electrode
3: Solder Alloy
4: Flux Residue
5: Underfill

The invention claimed is:
1. A flux comprising:
   a thermosetting resin;
   a hardening agent;
   an organic acid; and
   a solvent, wherein the organic acid is a long-chain dibasic acid mixture in which long-chain dibasic acids having the following compositions (1) through (4) are respectively mixed at a predetermined ratio thereof, as follows:
   (1) 2-Methylnonanedioic acid, 30% to 60% by mass based on 100% by mass of the long-chain dibasic acid mixture;
   (2) 4-(Methoxycarbonyl)-2,4-dimethylundecanedioic acid, 8% to 20% by mass based on 100% by mass of the long-chain dibasic acid mixture;
   (3) 4,6-bis(Methoxycarbonyl)-2,4,6-trimethyltridecanedioic acid, 8% to 20% by mass based on 100% by mass of the long-chain dibasic acid mixture; and
   (4) 8,9-bis(Methoxycarbonyl)-8,9-dimethylhexadecanedioic acid, 15% to 30% by mass based on 100% by mass of the long-chain dibasic acid mixture, and
   wherein the flux contains 3% or more by mass to 8% or less by mass of the resin, 1% or more by mass to 5% or less by mass of the hardening agent, wherein the amount of the hardening agent is no greater than the amount of the resin, 5% or more by mass to 15% or less by mass of the long-chain dibasic acid mixture and a remainder of the solvent.
2. The flux according to claim 1, wherein the flux further contains at least one of a thixotropic agent and a silane coupling agent in which more than 0% by mass to 5% or less by mass of the thixotropic agent is added or more than 0% by mass to 1% or less by mass of the silane coupling agent is added.
3. The flux according to claim 1, wherein the resin is epoxy resin.
4. The flux according to claim 1, wherein the hardening agent is an acid anhydride.
5. The flux according to claim 2, wherein the resin is epoxy resin.
6. The flux according to claim 2, wherein the hardening agent is an acid anhydride.

7. The flux according to claim 3, wherein the hardening agent is an acid anhydride.

8. The flux according to claim 5, wherein the hardening agent is an acid anhydride.

* * * * *